United States Patent [19]

Bhagawan et al.

[11] 3,778,819

[45] Dec. 11, 1973

[54] KEYBOARD WITH FOUR CHARACTER SET SHIFT

[75] Inventors: Venkatesha S. Bhagawan, Kingston; Richard A. Jones, Red Hook; Allen W. McDowell; George D. Mine, both of Kingston; Louis J. Remsburger, Pine Plains; Bruce A. Rupp, West Hurley; Rodney R. Whittaker, Kingston, all of N.Y.

[73] Assignee: International Business Machines Corporation, Armonk, N.Y.

[22] Filed: Nov. 17, 1972

[21] Appl. No.: 307,676

[52] U.S. Cl. .............................. 340/365 S, 197/71

[51] Int. Cl. .............................. G06f 3/02

[58] Field of Search .................. 340/365 S; 197/98, 197/71, 1 A; 178/17

[56] References Cited

UNITED STATES PATENTS 3,623,588 11/1971 Prodan .......................... 340/365 S 3,319,516 5/1967 Brown.............................. 197/1 A

*Primary Examiner*—John W. Caldwell

*Assistant Examiner*—Robert J. Mooney

*Attorney*—William S. Robertson et al.

[57] ABSTRACT

A circuit is provided for operating a keyboard in a selected one of four character sets: upper and lower case Latin and upper and lower case Katakana. The circuit responds to signals produced by the familiar Shift and Lock keys of a conventional keyboard. One of the shift keys is designated a Latin shift key and the other is designated a Katakana shift key. Depressing a shift key momentarily sets the keyboard to operate in the lower case of the character set identified by the shift key. For upper case, the operator either sets the shift Lock or holds the appropriate shift key while striking a character key. A specific logic circuit is disclosed.

8 Claims, 1 Drawing Figure

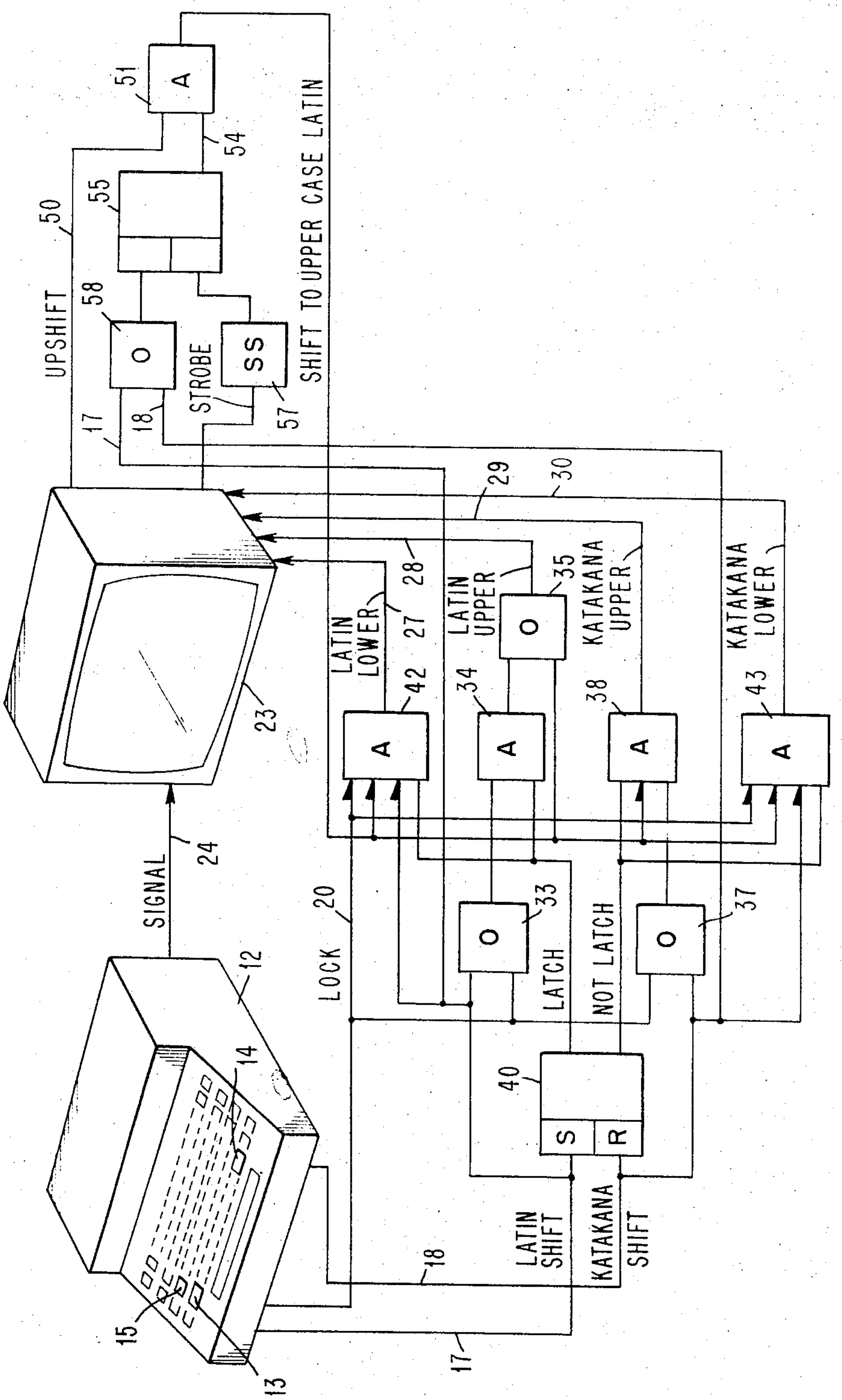
UPSHIFT
STROBE
SHIFT TO UPPER CASE LATIN
SIGNAL
LOCK
LATCH
NOT LATCH
LATIN LOWER
LATIN UPPER
KATAKANA UPPER
KATAKANA LOWER
LATIN SHIFT
KATAKANA SHIFT
A
O
SS
S
R
12
13
14
15
17
18
20
23
24
27
28
29
30
33
34
35
37
38
40
42
43
50
51
54
55
57
58

KEYBOARD WITH FOUR CHARACTER SET SHIFT

It is frequently desirable to use a standard keyboard to represent more than one set of characters. A typewriter, for example, has two character sets for upper case and lower case; and to produce a character in upper case, the operator holds one of the two shift keys and strikes a character key. A conventional lock key can be depressed initially to keep the operation in upper case and again depressed to return to lower case. As another example, a keyboard for a keypunch commonly has a set of alphabetic characters arranged in the style of a typewriter and an overlying set of numerals arranged as in an adding machine keyboard. An "alpha" key and a "numeric" key permit the operator to select either character set.

In the preceding example, the keyboard has only two character sets: upper and lower case for the typewriter and alpha and numeric for the keypunch. Some printing and display devices provide a much wider choice of character sets and permit selecting a character set by simple circuit operations without actually exchanging mechanical or electrical components of the device. In the example that will be used later, a visual display generates characters from data stored in a read only memory, and storage capacity is provided for the familiar upper and lower case Latin characters and for upper and lower case Katakana, a Japanese language character set. A selected character is formed by addressing the read only store at the appropriate location and illuminating the display at points that are defined by the data pattern at the addressed storage location. Thus, a particular character can be identified by its storage address, and a particular character set is identified by a signal line that selects the portion of the read only store where the corresponding character set is stored. A general object of this invention is to provide new and improved means for generating these character set selection signals from keyboard operations.

THE INVENTION

Another object of this invention is to use the shift and lock keys of a familiar typewriter or similar keyboard for producing shift operations between several character sets, and the invention is useful in a variety of applications without modifying a keyboard. Another object is to use the shift and lock keys on the keyboard as nearly as possible in the familiar way that these keys are used for applications that permit only shifting between upper and lower case between a single character set or to use the keys in ways that are distinctly different and are not confusing.

One of the two shift keys is designated "Latin Shift" and the other is designated "Katakana Shift." Depressing momentarily and then releasing one of the two shift keys causes the system to operate thereafter in the lower case of the character set of the depressed shift key. When an operator depresses and holds a shift key and strikes a character key, the character is selected from the upper case of the character set of the shift key. Initially depressing the locked key produces an upper case shift in the selected character set and depressing the locked key again releases the lock and returns the operation to the lower case.

The invention also provides means for controlling the shifts in part from a source external to the keyboard, such as a data processing system associated with the display device.

Other features and advantages of the invention will be discussed in the description of the preferred logic circuit that provides the operations just described.

THE DRAWING

The single FIGURE in the drawing shows a keyboard and a display and a logic diagram of the preferred circuit of this invention.

THE EMBODIMENT OF THE DRAWING

The drawing shows a keyboard 12 having left and right shift keys 13, 14 and a shift lock key 15. In the familiar use of such keyboards, closing either of the shift keys 13, 14 shifts the character set from lower case to upper case, and momentarily depressing the lock key and one of the shift keys holds the keyboard in upper case until the locked key is again depressed. However, according to this invention, the two shift keys 13, 14 are operated to select one of four different character sets. In the example of the drawing, key 13 is designated "Latin" and controls upper or lower case latin characters, and the right hand shift key 14 is designated "Katakana" and controls upper and lower case Katakana characters. Depressing the left shift key 13 produces a 1 logic level signal on a line 17 identified as Latin Shift and depressing key 14 produces a 1 logic level signal on a line 18 identified as Katakana Shift. Shift lock key 15 produces a 1 logic level signal designated "Lock" on a line 20 when the key is closed.

A display 23 is connected to respond to the signals on line 24 from keyboard 12 that define characters and it responds to signals on lines 27 through 30 that are produced by the logic circuit of the drawing to select one of the four character sets identified by legends on these lines.

The components of the logic circuit will be introduced as they appear in the following description of the operation of the circuit. To shift into Latin upper case for a single character, the operator depresses Latin shift key 13 and thereby produces a 1 logic level on line 17. The signal on line 17 is applied through intervening gates 33, 34, and 35 to produce the signal Latin Upper on line 28. (At this point in the description it can be seen that OR gates 33 and 35 permit shifting to Latin upper case in response to other signals that will be described later and that AND gate 34 operates to inhibit the upper case shift in certain conditions that will be described later.) OR gate 37, and AND gate 38 operate to produce the signal Katakana Upper on line 29 in response to a signal Katakana Shift on line 18 in the way already described for the corresponding gates 33 and 34. OR gate 35 of the Latin upper case logic does not have a counterpart in the Katakana upper case logic.

A latch 40 is connected to be set in response to the signal Latin Shift on line 17 and to be reset in response to the signal Katakana Shift on line 18 and thus to store the identity of the shift key that was last depressed. Latch 40 cooperates with the signal Lock on line 20 to maintain the signal Latin Upper on line 28 or the signal Katakana Upper on line 29 when the Lock key is locked. OR gates 33 and 37 which were introduced in the description of the upper case circuits each receive an input Lock from line 20. AND gate 34 receives a signal from the set output of latch 40 and thereby produces the signal Upper Case Latin at its output only when latch 40 is set. Thus, gate 34 has the logic function (Latin Shift, OR Lock) AND Latch. An equivalent expression is Latin Shift OR (Lock AND Latch), and an equivalent circuit can be implemented according to this expression. AND gate 38 in the Katakana logic similarly cooperates with latch 40 and OR gate 37 to produce at its output the logic function (Lock and Not Latch) OR Katakana Shift, and various equivalent functions and circuits will be readily apparent.

In the absence of a signal on either line 17, 18 or 20, AND gates 34 and 38 are closed and (except for the operation of OR gate 35 which has been introduced and will be described later) the upper case lines 28 and 29 carry 0 logic level signals. An AND gate 42 in the Latin logic receives an input from the set output of Latch 40 and a corresponding AND gate 43 in the Katakana logic is connected to receive the reset output Not Latch of latch 40. Thus, except for inhibiting inputs to gates 42 and 43 that will be described later, gate 42 and latch 40 cooperate to maintain the signal Latin Lower =1 on line 27 when latch 40 is set; and latch 40 and gate 43 cooperate to maintain the signal on Katakana Lower =1 on line 30 when latch 40 is reset. The other inputs to gates 42, 43 close these gates for various upper case operations. An inverted input (as represented schematically by the half arrow) to gate 42 from line 17 inhibits gate 42 while the Latin shift key is depressed. A similar input to gate 43 inhibits the signal Katakana Lower while the Katakana shift key is depressed. Inverted inputs Not Lock from line 20 similarly inhibit the lower case operations when the Lock key is closed. Thus, Latin Lower = Latch AND NOT (Lock or Latin Shift) and similarly Katakana Lower = Not Latch AND NOT (Lock or Katakana Shift).

Thus, as the circuit has been described so far, depressing either of the shift keys produces a 1 logic level on the corresponding upper case line 28 or 29 and sets the latch to the corresponding state. Releasing the shift key changes the operation to the lower case of the selected character set and produces a 1 logic level signal on line 27 or 28. Closing the Lock key changes the operation from lower case to upper case in the selected character set. Closing a shift key while the Lock key is already closed would produce 0 logic level signals on each of the lines 27 through 30 but would set or reset the latch to permit operation in the selected character set after the shift key is released.

The drawing also shows a circuit for selecting a predetermined character set, Latin Upper, in response to a signal designated Upshift on a line 50 that is produced by display 23 or the system associated with the display. The signal Upshift is transmitted through an AND gate 51 to produce an input to OR gate 35 which produces the output Latin Upper which has been described already. AND gate 51 produces inverted inputs to gates 38, 42, 43 to inhibit the normal operation of the circuit from producing the signals Latin Lower, Katakana Upper or Katakana Lower. An input 54 controls AND gate 51 to permit the keyboard to override the system for a single character. Input 54 is provided by the reset output of a latch 55. The signal Strobe is produced by the system at the end of each character selecting operation and a single shot circuit 57 responds to signal Strobe to reset latch 55 at the end of a character operation. Latch 55 is connected to be set in response to the output of an OR gate 58 when either shift key is closed. For the operation of the circuit described in the preceding paragraphs, line 50 carries a 0 logic level and the inverted output of AND gate 51 at the inputs of gates 38, 42, and 43 permits these gates to operate in the way already described. Latch 55 is reset at the end of each character operation, and when the system produces a 1 logic level signal on line 50, AND gate 51 produces a 1 logic level signal on line 28 and 0 logic level signals on lines 27, 29 and 30. If the operator closes either the Latin shift key or the Katakana shift key to select either of the four character sets as already described, gate 58 produces a signal to set latch 55 and thereby inhibit the output of gate 51 to permit the system to operate in the selected character set. After one character has been entered, the signal Strobe resets latch 55 to operate in Latin upper case if line 50 carries the signal Upshift =1.

OTHER EMBODIMENTS OF THE INVENTION

Those skilled in the art will recognize a wide variety of applications for the circuit of this invention. Keyboard 12 is representative of a variety of well known keyboards that have standard left and right shift keys and a lock key. Display 23 is representative of a variety of devices that produce selectable sets of character displays in response to a manual keyboard entry defining a character and an electrical signal defining the character set that the character is selected from. From a more general standpoint, the Latin and Katakana character sets represent character sets that are most frequently used independently of each other but may require shifting from one character set to the other. As is true of the familiar typewriter keyboard, the upper and lower character sets from a more general standpoint can be thought of as a more commonly used and a less commonly used subset of a character set.

A more specific description of the preferred character generating apparatus will suggest adaptations for the use of the invention with other devices. The usual keyboard has 64 or fewer character keys so the system can be thought of either as having four character sets of 64 characters each or as one character set of 256 characters. The 256 characters can be individually identified by an 8 bit code or, equivalently, one of the four character sets of 64 characters can be identified by 2 bits and one of the 64 characters in the identified set can be selected by six bits. As the keyboard and display are arranged in the drawing, line 24 carries these six bits, and the four lines 27–30 are the decoded form of the two bits for character set selection. For example, one bit can represent the binary logic function Katakana/Latin which is provided by latch 40 and the other bit can represent the function Upper case/Lower case which is provided by Upper Case = Latin Shift OR Katakana Shift (at the output of gate 58) OR Lock (on line 20). For some keyboards, line 24 carries the eight bit code and lines 27–30 are applied to the keyboard either to be encoded as one or both of the two bits described in the preceeding sentence or to directly cooperate with the character keys for selecting an 8 bit code from a read only store in the keyboard. In such an arrangement, lines 17, 18 are applied to the display as shown in the drawing for operating gate 58.

The logic function represented by the drawing can of course be implemented in various circuit families for providing the same function in a different configuration. Other variations and modifications will be apparent within the spirit of the invention and the scope of the claims.

What is claimed is:

1. In a keyboard having character keys and first and second shift keys, apparatus for responding to said two shift keys to select one of four character sets, comprising;

a latch and means connecting said first shift key to control setting said latch and connecting said second shift key to control resetting said latch, said first key being identified with a first character set having upper and lower case character subsets and said second shift key being identified with a second character set having upper and lower case character subsets, whereby the state of said latch identifies one of said first and second character sets, means responsive to the closing of one of said character keys and to the state of said latch and to the absence of the closing of either of said shift keys to select a character in the lower case of the character set identified by the latch, and means responsive to the concurrent closing of one of said shift keys and one of said character keys for selecting a character in the upper case of the character set identified by the state of said latch.

2. The apparatus of claim 1 wherein said means connecting said shift keys to control said latch includes means connecting said latch to be set in response to the closing of said first shift key and to be reset in response to the closing of said second shift key.

3. The apparatus of claim 2 wherein said means for selecting a character in the upper case includes means responsive to the closing of said first shift key to select the upper case of said first character set and means responsive to the closing of said second shift key to select the upper case of said second character set.

4. The apparatus of claim 3 wherein said keyboard includes a shift lock key and said means to select the upper case includes means responsive to the closed state of said lock key for selecting the upper case.

5. The apparatus of claim 4 including means responsive to the state of said latch, said shift keys and said lock key for producing four signals separately identifying said upper case of said first set, said lower case of said first set, said upper case of said second set, and said lower case of said second set.

6. The apparatus of claim 5 including means responsive to the closed state of said shift lock key for inhibiting a signal identifying either of said lower case subsets.

7. The apparatus of claim 6 including means to produce a predetermined one of said signals and to inhibit the other three of said signals independently of the state of said latch.

8. The apparatus of claim 7 including means responsive to the closing of one of said shift keys to select one character to be keyed in a selected character subset when said predetermined signal is produced.

* * * * *